(12) United States Patent
Klarl et al.

(10) Patent No.: US 9,403,668 B2
(45) Date of Patent: Aug. 2, 2016

(54) DEVICE FOR PROCESSING CONTAINERS WITH CONTAINER ALIGNMENT

(75) Inventors: Hermann Klarl, Thalmassing (DE); Stefan Roithmeier, Neutraubling (DE); Erik Blochmann, Neutraubling (DE); Sebastian Beulshausen, Regensburg (DE); Reiner Gloetzl, Pentling (DE)

(73) Assignee: Krones, AG, Neutraubling (DE)

( * ) Notice: Subject to any disclaimer, the term of this patent is extended or adjusted under 35 U.S.C. 154(b) by 664 days.

(21) Appl. No.: 13/327,637

(22) Filed: Dec. 15, 2011

(65) Prior Publication Data

US 2012/0151883 A1    Jun. 21, 2012

(30) Foreign Application Priority Data

Dec. 16, 2010  (DE) .................. 10 2010 054 792

(51) Int. Cl.
| | | |
|---|---|---|
| B67C 7/00 | (2006.01) | |
| B65D 1/00 | (2006.01) | |
| B65G 47/244 | (2006.01) | |
| B65G 47/84 | (2006.01) | |

(52) U.S. Cl.
CPC .............. *B67C 7/004* (2013.01); *B65G 47/244* (2013.01); *B65G 47/846* (2013.01); *B65D 1/00* (2013.01)

(58) Field of Classification Search
CPC ........ B65B 7/285; B29C 49/04; B29C 49/06; B29C 49/4205; B29C 49/64; B67C 2003/227; B67C 7/00; B67C 7/002; B67C 3/24; B67C 7/004
USPC ............ 53/452, 561, 563, 456, 285, 490, 314
See application file for complete search history.

(56) References Cited

U.S. PATENT DOCUMENTS

| | | | | |
|---|---|---|---|---|
| 2,620,058 A | * | 12/1952 | Smith et al. | ................ 198/477.1 |
| 2,689,057 A | | 9/1954 | Kantoe et al. | |
| 4,096,683 A | * | 6/1978 | McMickle, Jr. | ................. 53/244 |
| 4,096,939 A | * | 6/1978 | Riggs et al. | ................ 198/460.1 |
| 4,338,155 A | | 7/1982 | Buchele | |
| 5,558,233 A | | 9/1996 | Dimmick et al. | |

(Continued)

FOREIGN PATENT DOCUMENTS

| | | |
|---|---|---|
| CN | 1262656 | 8/2000 |
| CN | 1196638 | 4/2005 |

(Continued)

OTHER PUBLICATIONS

German Search Report from priority application DE 10 2010 054 792.1, dated Sep. 28, 2011.

(Continued)

*Primary Examiner* — Andrew M Tecco
*Assistant Examiner* — Chelsea Stinson
(74) *Attorney, Agent, or Firm* — Onello & Mello LLP

(57) ABSTRACT

A device for production of drinks containers may include a forming device which transforms plastic preforms into plastic containers, a filling device which is arranged after the forming device in the transport direction of the plastic containers and fills the plastic containers with a fluid, and a transport device which transports the plastic containers individually from the forming device in the direction of the filling device along a prespecified transport path. The device includes, along the transport path, an alignment device which aligns the plastic containers at least partially in relation to a rotary position about their longitudinal axis.

19 Claims, 4 Drawing Sheets

(56) References Cited

U.S. PATENT DOCUMENTS

| | | | |
|---|---|---|---|
| 5,591,462 A * | 1/1997 | Darling et al. | 425/173 |
| 5,844,677 A * | 12/1998 | Dimmick et al. | 356/240.1 |
| 6,279,722 B1 | 8/2001 | Bankuty et al. | |
| 6,298,638 B1 * | 10/2001 | Bettle | 53/452 |
| 6,436,330 B1 | 8/2002 | Winter | |
| 6,484,478 B1 * | 11/2002 | Arends et al. | 53/544 |
| 6,763,928 B2 | 7/2004 | Girotto et al. | |
| 2003/0113172 A1 | 6/2003 | Girotto et al. | |
| 2009/0223175 A1 * | 9/2009 | Monzel | 53/456 |
| 2010/0089008 A1 * | 4/2010 | Parini | B65B 1/186 53/452 |

FOREIGN PATENT DOCUMENTS

| | | |
|---|---|---|
| DE | 10 2008 008 528 A1 | 8/2009 |
| GB | 2075943 | 11/1981 |
| WO | 00/78664 A1 | 12/2000 |
| WO | 2010/013207 A2 | 2/2010 |

OTHER PUBLICATIONS

Chinese Office Action issued on Dec. 19, 2013 in corresponding Chinese Application No. 201110424849.8.

Second Chinese Office Action issued in corresponding Chinese Application No. 201110424849.8.

* cited by examiner

DEVICE FOR PROCESSING CONTAINERS WITH CONTAINER ALIGNMENT

CROSS-REFERENCE TO RELATED APPLICATION

This application claims the benefit of priority of German Patent Application No. 10 2010 054 792.1, filed Dec. 16, 2010, pursuant to 35 U.S.C. 119(a)-(d), the disclosure of which is incorporated herein by reference.

TECHNICAL FIELD

The present disclosure relates to a device and a method for production of plastic containers.

BACKGROUND

Devices and methods for production of plastic containers have been known for some time from the prior art. Here it is known amongst others that in such production methods, plastic containers are produced by transforming heated plastic preforms into plastic containers by pressurisation. These containers are then filled with fluids, in particular drinks, and finally closed. Containers are also known from the prior art which do not have a circular cross-section but cross-sections deviating therefrom, such as for example elliptical cross-sections. In production of such cross-sections, special blowing machines are provided which have correspondingly elliptically formed blowing moulds. However such containers which do not have a circular cross-section occasionally cause problems in labelling and filling, since the filling and labelling machines require a precise alignment of the containers.

WO 2010/013207 A2 describes a plant for blow moulding of plastic containers and in particular bottles. This plant has a multiplicity of interchangeable blowing moulds which each form cavities for moulding the containers.

Therefore it may be desirable to simplify the production of containers, in particular containers with non-circular cross-section, for example oval containers. In particular, it may be desirable to facilitate the closing and labelling of the containers.

SUMMARY

According to various aspects of the disclosure, a device for production of drinks containers has a forming device which transforms plastic preforms into plastic containers. Furthermore this device has a filling device which is arranged after or downstream of the forming device in the transport direction of the plastic containers and fills the plastic containers with a fluid, and furthermore a transport device which transports the plastic containers in particular individually along a pre-specified transport path from the forming device in the direction of the filling device.

According to the disclosure along this transport path is provided an alignment device which aligns the plastic containers at least partly in regard to a rotational position about their longitudinal axis.

Thus this alignment device causes a rotation of the plastic containers in relation to their longitudinal direction.

The forming device is in some aspects a blow moulding machine and in particular a stretch-blow moulding machine which expands the plastic preforms by pressurisation with a gaseous medium, in particular air. This forming device in some aspects produces containers which have a non-circular base body, for example an elliptical or rectangular base body.

The forming device can however usually only deliver the containers to these subsequent devices, such as for example a transport wheel, with an angular precision of +/−10° at the outlet.

In an exemplary embodiment a transport device is provided which transports the plastic containers from the forming device to the alignment device and in some aspects also through the alignment device. In some aspects this transport device has a multiplicity of gripper elements which grip the containers, for example below their carrier ring.

These gripper elements within this transport device have a constant spacing from each other or a constant pitch. It would also be possible for the pitch of the plastic containers to be kept constant both in the forming device and in the subsequent transport device. Particularly in some aspects this pitch is also maintained in a subsequent filling or labelling device.

In an exemplary embodiment the alignment device aligns the plastic containers such that after leaving the alignment device, they are each oriented in the same position in relation to their longitudinal axis. This means that the individual plastic containers in some aspects enter the next machine, for example a filling device or a labelling device, substantially with a uniform rotary position. In an exemplary embodiment the alignment device is arranged at least partly stationary in relation to the transport path of the containers. Thus it would be possible for the alignment device to be arranged stationary and the containers guided along the transport path to pass through this device.

In an exemplary embodiment the alignment device has a turning device which rotates the plastic containers through a specified rotary angle in relation to their longitudinal axis. Here it is possible for the plastic containers first to be delivered to the rotary device and then rotated by this through a uniform angle.

In an exemplary embodiment the alignment device has an alignment unit which is arranged after the turning device in the transport direction of the plastic containers and which rotates the plastic containers at least partly in relation to their longitudinal direction. Thus in some aspects the plastic containers are first rotated uniformly by the turning device and then oriented in relation to their longitudinal direction in a subsequent alignment unit. Thus the alignment device as a whole is formed of two pieces and comprises firstly said turning device and then the alignment device.

In some aspects the plastic containers are transported before and in some aspects also during this alignment by means of gripper elements, wherein these gripper elements allow a relative rotation of these containers in relation to the gripper elements (and in relation to the longitudinal axis of the containers). These gripper elements are in some aspects controllable gripper elements, the opening and closing position of which is controllable. In some aspects the gripper elements grip the plastic containers below a carrier ring while these are being aligned in relation to their longitudinal direction. It would also be possible for the gripper elements to grip the plastic containers above their carrier ring during rotation.

In an exemplary embodiment the alignment device has a first contacting element for aligning the plastic containers, wherein this first contacting element contacts the plastic containers on their outer surface to align them. By contact with this contacting element, the plastic containers are rotated in relation to their longitudinal axis and thus aligned. In some aspects the contacting element contacts the plastic containers at their base body i.e. a region lying below the mouth and above the bottom of the plastic container. This region is in some aspects formed rotationally non-symmetrical, for example oval or rectangular, so that by contact with the contacting element, the plastic container is rotated in relation to its longitudinal direction. In some aspects the gripper elements for holding the containers are arranged offset to the contacting elements in the longitudinal direction of the containers, and particularly in some aspects arranged higher than the contacting elements.

In an exemplary embodiment the alignment device has a second contacting element and the transport path (of the containers) runs between the first contacting element and the second contacting element. Thus for example it is possible for the plastic containers to be aligned in relation to their rotary position when passing through these contacting elements. For example the contacting elements can be spaced by a distance which substantially corresponds to the shorter side of the plastic containers or their base body, in order to achieve an alignment in this way.

In some aspects at least one contacting element extends along a pre-specified section of the transport path (or parallel thereto). Here it would be possible for the contacting element to be designed rail-like. If two contacting elements are provided, both of these can be formed rail-like and opposite each other.

In an exemplary embodiment at least one contacting element is mobile in a direction perpendicular to the transport path. In this way it can be achieved that if for example containers are oriented incorrectly, they do not collide or are destroyed by the contacting elements but corresponding contacting elements yield and in this case a plastic container even with a transverse position can be transported through the alignment device. In some aspects, the at least one contacting element is pre-tensioned here by means of a pre-tensioning element in the direction of the transport path. This pre-tensioning can also achieve a largely precise alignment of the plastic containers.

In an exemplary embodiment a distance between the contacting elements or a distance between one contacting element and the transport path reduces at least in sections in the transport direction of the plastic containers. Inlet chamfers or entry curves can be provided which allow incorrectly positioned containers at an angle for example 10° to be able to be introduced between the two contacting elements. In some aspects in the embodiments described the alignment device is mechanical and in particular aligns the containers in relation to their rotary position by contact.

In an exemplary embodiment the device has an ejection device for ejecting containers and this ejection device is arranged between the forming device and the subsequent machine such as a filling device or a labelling device. Thus it would be possible for a filling device first to fill the container and then a labelling device to label the containers, or conversely first labelling by means of a labelling device and then filling by means of a filling device.

The present disclosure is furthermore directed at a method for production of plastic containers wherein plastic preforms are transformed into plastic containers by means of a forming device and for this the plastic preforms are supplied individually to a multiplicity of blowing stations, and wherein the pre-produced plastic containers are transported individually by means of at least one transport device in the direction of a filling device in order to be filled with liquid medium by this filling device. According to the disclosure, after leaving the blowing stations the plastic containers are aligned in relation to a rotary position about their longitudinal axis. In some aspects, the plastic containers are aligned individually or singly in relation to their rotary position.

The forming device is in some aspects a stretch-blow moulding machine which expands the plastic preforms by pressurisation with air and by means of a stretch rod. Here it is also possible for the plastic containers first to be transported to a labelling station and then moved to a filling station. Here it is possible for the plastic containers to be aligned immediately after leaving the blowing station, it would however also be possible for the alignment to take place only after a labelling machine.

Further advantages and embodiments are apparent from the appended drawings.

BRIEF DESCRIPTION OF THE DRAWINGS

In the figures.

DETAILED DESCRIPTION

Figure 1:
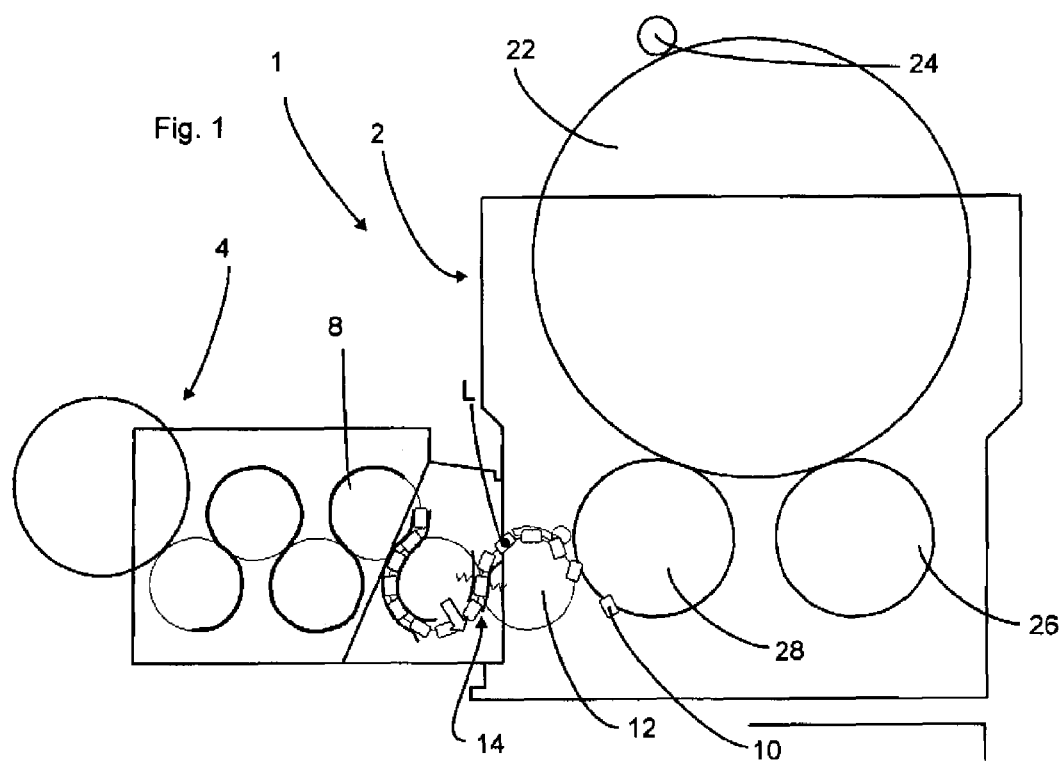
FIG. 1 is a diagrammatic overall view of an exemplary device for production of drinks containers according to various aspects of the disclosure.

FIG. 1 shows a device 1 for production of drinks containers. The device 1 has a forming device 2 which serves to transform plastic preforms into plastic containers 10. This forming device has a multiplicity of blowing stations 24 which can for example be arranged on a blowing wheel 22. During transport with the blowing wheel, plastic preforms are transformed into plastic containers in particular by pressurisation with compressed air.

Reference numeral 26 relates to an inlet star which supplies the plastic preforms to the blowing wheel 22, and reference numeral 28 designates an outlet star which receives the plastic containers thus produced. Usually the finished containers can be delivered to the outlet or outlet star 28 only with a precision of +/−10°. This outlet star is followed by a turning device 12 which is here part of the alignment device 12, 14. This turning device or orientation device rotates all containers by the same number of degrees. Rotation takes place in relation to a longitudinal direction L of the containers, which in FIG. 1 stand perpendicular to the figure plane. This direction L is also the longitudinal direction of the containers.

The turning device 12 is followed by an alignment unit 14 which aligns the containers by rotation about their longitudinal axis L such that all have the same orientation. More precisely the plastic containers are guided after delivery to the turning device and rotated to the correct position.

After the alignment device 12, 14, the plastic containers can be delivered to a device 8 for bottom cooling. Finally the containers can be delivered to the filling device 4 (indicated diagrammatically only). However a labelling device could also be provided before the filling device 4.

Figure 2:
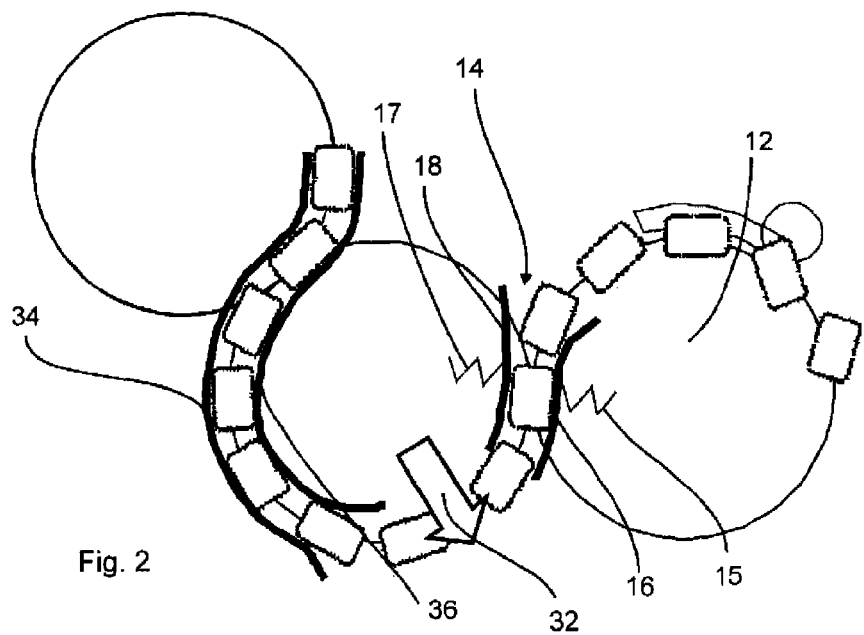
FIG. 2 is a detailed view of the plant shown in FIG. 1.

FIG. 2 shows a detailed depiction of the arrangement shown in FIG. 1, more precisely the region of the turning device 12 and the alignment unit 14. The containers rotated through a specific angle by the turning device 12 enter between two contacting elements 16 and 18 which contact the body of the containers and align these in relation to their rotary position. The two contacting elements 16 and 18 designed here rail-like are pre-tensioned by springing devices 15 and 17.

If a container is positioned incorrectly, the respective contacting element or both contacting elements 16 and 18 can yield. Furthermore a detection device (not shown) is also provided which detects a particular deflection of the contacting elements 16 and 18 or an incorrect position of the container 10. In response to such a detected incorrect position, the container concerned can be ejected by means of an ejection device 32 (indicated merely diagrammatically). The unejected containers are guided between two further rail elements 34 and 36 so that they have a precisely defined rotary position. In some aspects, the containers are each guided at their neck areas but are arranged rotatable in relation to their gripper elements or guides so that a twist is possible in relation to the gripper elements.

The outlet star 28 shown in FIG. 1 can be designed as a pitch-adjustment star, wherein this outlet star 28 is followed by the turning device 12 which as stated above rotates the containers by a particular angle. If a plastic container remains suspended in the blow mould, or in an emergency stop situation, the containers can also arrive at an undefined angle. To avoid collision then, the following procedure is conceivable.

The alignment unit 14 collects the containers from the turning device 12 with a precision of +/−10°. At the corresponding star, a trunk star can be provided which has a maximum contour corresponding to the bottle diagonal. Bottles which are twisted by more than 10° (corresponds to 7.5 mm) are detected directly after the delivery point (with the clamp already closed) by a sensor device and a switch (e.g. a rod switch) and the gripper elements open. The containers ejected in this way can for example be discharged to the outside via a chute and also an opening. In the case of an emergency stop, the containers can be delivered undefined. Therefore in the case of an emergency stop, ejection is activated automatically and the containers are ejected until the plant stops. The ejection of the containers can be supported by an additional springing device e.g. a leaf spring at the mouth.

Also the containers can be passed on to the alignment unit 14 with a precision of +/−10°. The contacting elements 16 and 18 can accommodate bottle contours with +/−10°. It is evident that the contacting element 16 is formed hopper-like so that it initially has a greater radius (corresponding to +/−10°+ inlet slope). At the end of the curve 16, the radius or the distance between the contacting elements 16 and 18 is reduced to a clearance of around 1 mm. It would be also conceivable here for only one contacting element to be provided which moves hopper-like on the transport path of the containers.

From the star 8, the star pockets and the curve radius correspond to the normal course of a container contour.

The clamp radius of alignment unit 14 or the transport star concerned is designed so loosely that the container remains rotatable in a closed clamp. In some aspects, the transport star of the alignment unit 14 is a transport star which grips underneath i.e. a transfer star which grips the container below its carrier ring. The turning device 12 is in some aspects a turning star which grips from above i.e. a turning star which grips the container above its carrier ring.

In some aspects, a bulkhead is provided at the delivery point which is adapted to the alignment unit 14. Accordingly the installation position for the switch device (e.g. rod switch) can also be taken into account.

In the further course, on the filling carousel a guide curve is provided which is designed sufficiently long, especially at the inlet, for the container to be filled or the bottom of the container to be covered completely with a filling product. In the filler carousel, trunk pockets can also be provided in the container contour, which prevent a twisting of the containers.

Between the first and second transfer star, a partition wall can be introduced and the said bottom cooling can also begin in the second transfer star.

Figure 3:
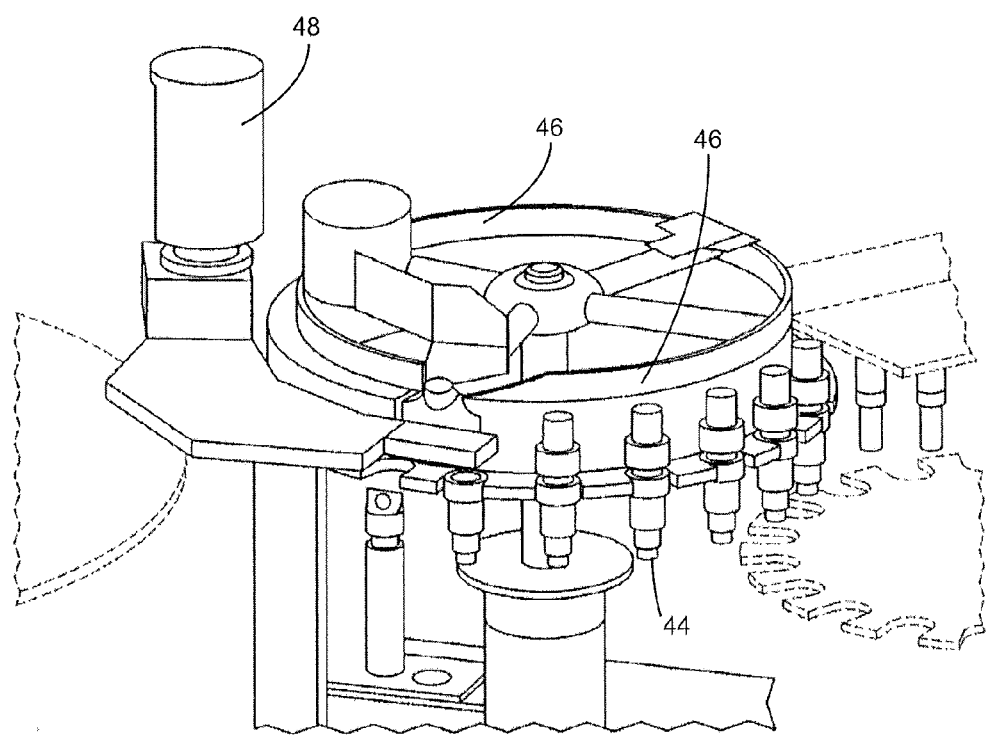
FIG. 3 is a further depiction of part of the device according to the disclosure.

FIG. 3 shows a further depiction of the turning unit 12. It is evident that the device has a multiplicity of holding mandrels 44 which can engage in the mouths of the containers to guide these. A belt 46 is also provided which can set the holding mandrels 44 in rotation and thus turn all plastic containers through a particular angle. The containers are then delivered to the next star, for example, ejector star 13 described herein. Reference numeral 48 designates a drive device for driving the belt 46. The individual rotation of the plastic preforms could here be carried out by means of servomotors.

Figure 4:
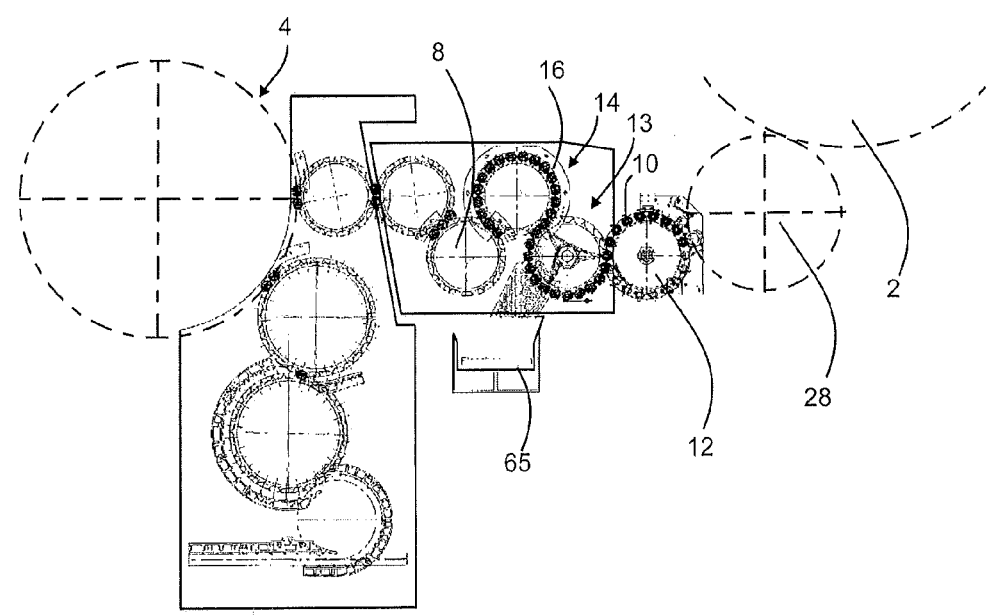
FIG. 4 illustrates a device according to the disclosure in a further embodiment.

FIG. 4 shows a further embodiment of a device according to the disclosure for the production of containers. In this embodiment only one contacting element 16 is provided and the alignment unit 14 which comprises this contacting element 16 is not arranged directly after the turning device 12 as in the previous embodiments. The containers here, as in the previous embodiments, are delivered starting from the forming device via the outlet star 28 to the turning device 12 in which they are turned uniformly through a specified rotary angle. The containers are then transported via an ejector star 13 which comprises controllable gripper elements for the containers so that these can be ejected.

After this process comes the alignment unit 14 with which the containers can be oriented in relation to their rotary position. A bottom cooling unit 8 can then follow.

Figure 5A:
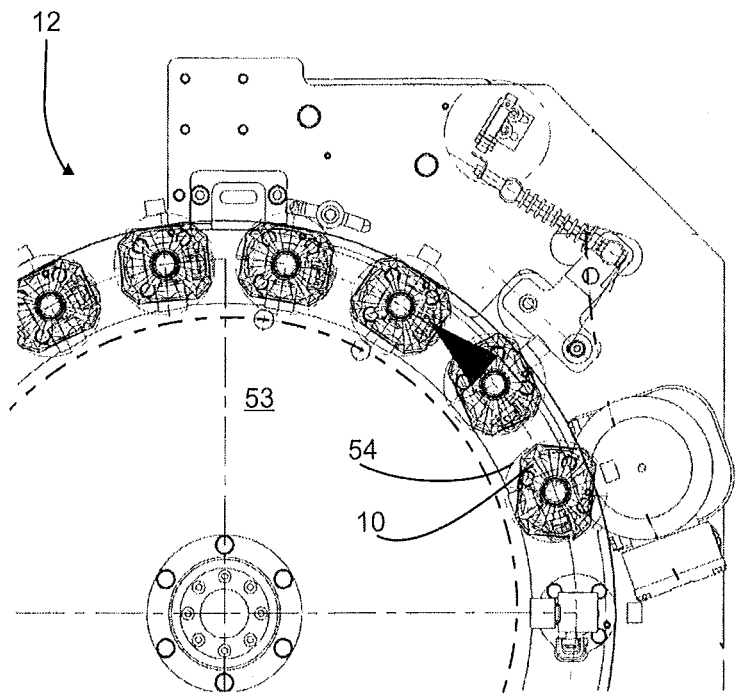
FIGS. 5a-5d illustrate four part views of the device shown in FIG. 4.

FIG. 5a shows a partial depiction or more precisely the turning device 12. The plastic containers are delivered to this turning device 12 and then rotated through a uniform turning angle. It is shown that the turning device has a trunk star 53 with recesses 54, wherein these recesses here have substantially the diameter of the diagonals of the containers so that the containers can be turned with relatively little play in relation to these recesses 54. This prevents the containers 10 being able to rock during the turning process.

Figure 5B:
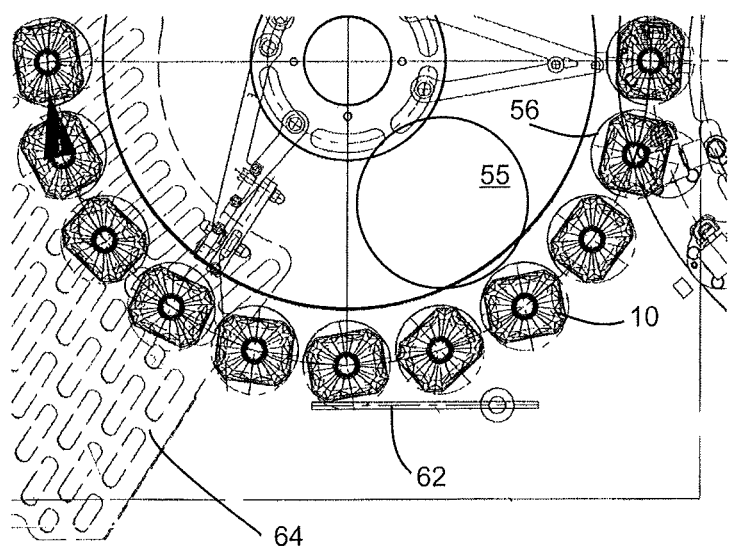

FIG. 5b shows a detailed depiction of an ejector star 13 following the turning device. This ejector star too comprises a trunk star 55 with recesses 56 which again are adapted to the outside of the containers. Reference numeral 62 designates a mechanical switch element which serves to check the alignment of the plastic containers 10. If plastic containers 10 are twisted too far, this triggers movements of this device or switch device 62 and in response to this switch movement, the gripper elements above a chute device 64 are opened so that the containers fall onto this chute device 64 and leave the flow. More precisely the containers can reach a bottle trolley 65 (see also FIG. 4) and be transported away.

Figure 5C:
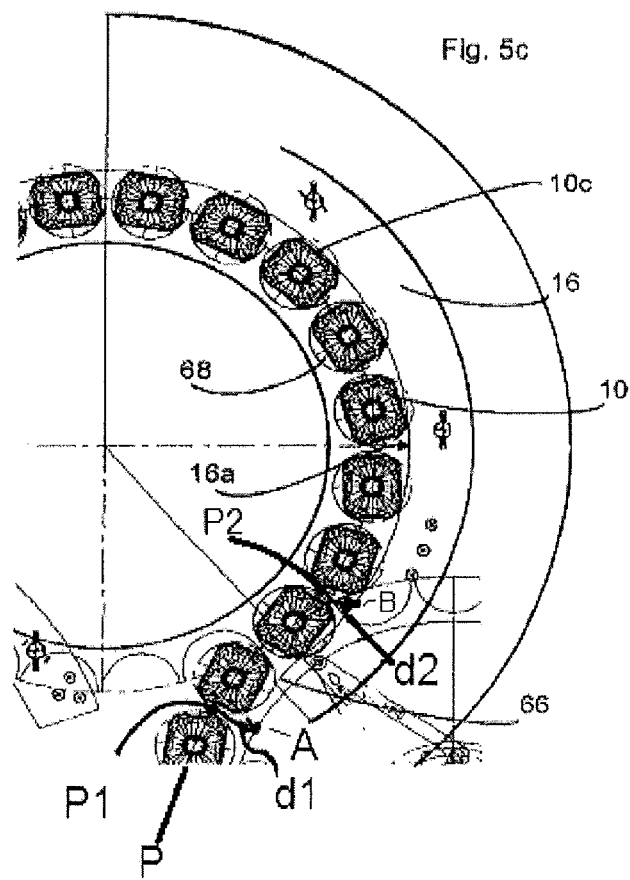

FIG. 5c again shows an enlarged view of the alignment unit 14. Here this has only one contacting element 16 which contacts the outer wall of the plastic containers to align these in their rotary position or longitudinal direction. This contacting element 16 in turn has an inlet area 66 which serves for insertion of the containers 10. Then the distance between the inner wall 16a of the contacting element and the transport path P of the plastic containers reduces, in some aspects, continuously until these are transported or guided via their long sides 10c. For example, a distance d1 between point A of the inner wall 16a and point P1 of the transport path P reduces to a distance d2 between point B of the inner wall 16a and point P2 of the transport path. This alignment unit 14 here also has a multiplicity of recesses 68 which are again adapted to diagonal containers so that the containers 10 are rotated in relation to these recesses 68. After leaving the alignment unit 14 the plastic containers are aligned in the specified way in order to be able to reach the assembly.

In contrast to the embodiments outlined above, no second contacting element is provided here but the alignment of the plastic containers takes place merely via the outermost contacting element 16.

It would however also be possible, instead of the contacting element here lying radially outside, to provide only a contacting element lying radially inside. Also as in the preceding embodiments, both an outer and an inner contacting element could be provided. Furthermore it would also be possible for the contacting element 16 to be sprung-mounted as in the preceding embodiments. In some aspects, this contacting element 16 has a coating which prevents excessive abrasion or damage to the plastic containers.

Figure 5D:
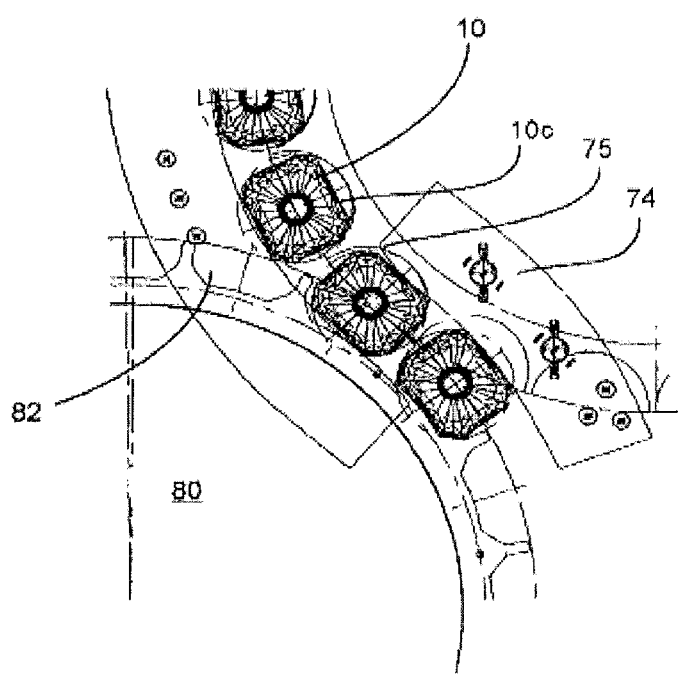

FIG. 5*d* shows a transitional area between the alignment unit 14 and the next assembly 8. It is evident that a guide element 74 is provided with an inlet chamfer 75 here which overlaps slightly with the contacting element 16 along the transport path P so that the containers are guided over a short path section by the first contacting element 16 and also the guide element 74. The assembly 8 again has a trunk star 80 wherein this trunk star 80 again has recesses 82 but which, in contrast to the preceding recesses, are designed such that the plastic containers cannot rotate in relation to these. In other words the recess 82 is here at least partly and, in some aspects, completely adapted to an outer contour of the containers. Thus in some aspects, from this position along the transport path, an oriented transport of the containers takes place via formed stars. The alignment unit 14 however performs the task of final orientation of the plastic containers.

The entire alignment device could however be formed in another manner. The containers could be transported by means of gripper devices such as holding mandrels 44 and a rotary position detection device could detect the rotary position of the containers in relation to their longitudinal axis. In response to the rotary position thus detected, servomotors could align the containers in the correct rotary position. In this case on a carrier wheel are arranged a multiplicity of servomotors which can be controlled independently, together with said detection device which detects the rotary position of the plastic containers. Such a detection device could for example be arranged below the containers and in each case record an image of the containers. During transport of the containers with said transport wheel, the alignment could also take place in relation to the longitudinal direction of the containers.

In addition it would also be possible to combine the features shown and explained in the individual embodiment examples. The individual transport stars shown in the figures together form a transport device for transporting the containers 10.

It will be apparent to those skilled in the art that various modifications and variations can be made to the device and method for production of plastic containers of the present disclosure without departing from the scope of the invention. Throughout the disclosure, use of the terms "a," "an," and "the" may include one or more of the elements to which they refer. Other embodiments of the invention will be apparent to those skilled in the art from consideration of the specification and practice of the invention disclosed herein. It is intended that the specification and examples be considered as exemplary only.

What is claimed is:

1. Device for production of drinks containers, comprising:
    a forming device which transforms plastic preforms into plastic containers;
    a filling device which is arranged after the forming device in the transport direction of the plastic containers and fills the plastic containers with a fluid;
    a transport device which receives the plastic containers individually from the forming device and transports the plastic containers in the direction of the filling device along a prespecified transport path; and
    an alignment device provided along the transport path, the alignment device aligning the plastic containers received from the transport device at least partially in relation to a rotary position about their longitudinal axis, wherein the alignment device comprises a turning device which rotates the plastic containers at a predetermined rotary angle, wherein the alignment device includes an alignment unit which is constructed and arranged after the turning device in the transport direction of the plastic containers and which rotates the plastic containers at least partially in relation to a longitudinal direction of the plastic containers, wherein the alignment unit has a pair of contacting elements for aligning the plastic containers, wherein the contacting elements contact the plastic containers to align the containers on their outer surface, and wherein the pair of contacting elements is constructed and arranged in a configuration including a first rail on one side of the outer surface of the containers and a second rail on another side of the containers so that the transport path extends between the first and second rails, and wherein the contacting elements are arranged to have a hopper configuration so that at least one contacting element of the contacting elements has a first radius that is greater at an end receiving the containers, and has a second radius at the other end of the at least one contacting element, or has a distance between the first and second contacting elements at the end receiving the containers that is greater than a distance at the other end, and wherein the at least one contacting element is movable in a direction perpendicular to the transport direction.

2. Device according to claim 1, wherein the alignment device aligns the plastic containers such that after leaving the alignment device the containers are oriented in the same rotary position in relation to their longitudinal axis.

3. Device according to claim 1, wherein the alignment unit is arranged stationary in relation to the transport path of the containers.

4. Device according to claim 3, wherein a distance between a contacting element of the pair of contacting elements and the transport path of the plastic containers reduces in the transport direction of the plastic containers.

5. Device according to claim 1, further comprising an ejection device for ejecting containers, the ejection device being arranged between the forming device and the filling device.

6. Device according to claim 1, wherein the plastic containers each have a non-circular cross section.

7. Device according to claim 1, wherein the plastic containers each have a mouth, a bottom region, and a base body below the mouth and above the bottom region, and wherein the contacting elements contact the plastic containers at the base body between the mouth and the bottom region.

8. Device according to claim 1, wherein the transport device comprises a plurality of gripper elements, which extend in a direction that is offset with respect to the longitudinal direction of the plastic containers, and higher than the contacting elements.

9. Device according to claim 1, wherein the contacting elements extend in a direction that is parallel to the transport path.

10. Device according to claim 1, wherein the contacting elements are pretensioned by at least one springing element.

11. Device according to claim 1, further comprising a detection device and an ejection device, wherein the detection device detects a particular deflection of the contacting elements, and wherein in response to the detection of the partial deflection of the contacting elements, a plastic container corresponding to the detected partial deflection is ejected by the ejection device.

12. Device according to claim 1, wherein the first and second rails are pretensioned in a direction perpendicular to the transport direction.

13. Device according to claim 1, wherein the alignment device further comprises a turning device, wherein the turning device has a trunk star having recesses, and wherein the recesses have a diameter that is the same or similar to a diameter of a container diagonal so that the containers can be turned in relation to the recesses 54, and wherein the trunk star grips the container sideways.

14. Device according to claim 1, further comprising an ejector star that includes a trunk star and recesses adapted to an exterior of the containers.

15. Device according to claim 1, further comprising a mechanical switch element that checks an alignment of the containers.

16. Device according to claim 15, further comprising a chute device, gripper elements above the chute device, and a bottle trolley along the transport path, wherein if a container rotates or twists too far, this triggers a movement of the mechanical switch element, wherein the gripper elements or the mechanical switch element, and in response to the movement of the mechanical switch element, the gripper elements above the chute device are opened so that the containers fall onto the chute device, and output to the bottle trolley.

17. Device according to claim 1, wherein the alignment device includes a plurality of recesses adapted to a diagonal of the containers so that the containers are rotated in relation to the recesses.

18. Device according to claim 1, further comprising a guide element and an inlet chamfer which overlaps a contacting element of the pair of contacting elements along the transport path so that the containers are guided over a short path section by the contacting element and the guide element.

19. Device according to claim 1, further comprising an assembly that includes a trunk star having a plurality of recesses constructed and arranged to prevent the containers from rotating, wherein the recesses are at least partially adapted to an outer contour of the containers.

* * * * *